United States Patent
Ali et al.

(10) Patent No.: US 9,219,308 B2
(45) Date of Patent: Dec. 22, 2015

(54) ADAPTIVELY OPTIMIZED METHOD AND SYSTEM OF PARASITIC ELEMENT SELECTION FOR SMART BEAM STEERING

(75) Inventors: Shirook Ali, Milton (CA); Michael Eoin Buckley, Grayslake, IL (US); James Paul Warden, Fort Worth, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 372 days.

(21) Appl. No.: 13/554,509

(22) Filed: Jul. 20, 2012

(65) Prior Publication Data
US 2013/0023218 A1    Jan. 24, 2013

Related U.S. Application Data

(63) Continuation of application No. PCT/US2011/044953, filed on Jul. 22, 2011.

(51) Int. Cl.
| | |
|---|---|
| H04B 17/00 | (2006.01) |
| H01Q 3/24 | (2006.01) |
| H01Q 19/30 | (2006.01) |
| H04B 1/00 | (2006.01) |
| H04B 15/00 | (2006.01) |
| H04W 16/28 | (2009.01) |

(52) U.S. Cl.
CPC ............... *H01Q 3/247* (2013.01); *H01Q 19/30* (2013.01); *H04W 16/28* (2013.01)

(58) Field of Classification Search
USPC .......................... 455/67.11, 67.14, 63.1, 63.4
See application file for complete search history.

(56) References Cited

U.S. PATENT DOCUMENTS

| | | | |
|---|---|---|---|
| 5,767,807 A * | 6/1998 | Pritchett | 342/374 |
| 6,980,782 B1 | 12/2005 | Braun et al. | |
| 7,132,989 B1 | 11/2006 | Poilasne | |
| 2003/0156061 A1 | 8/2003 | Ohira | |
| 2004/0150568 A1 * | 8/2004 | Chiang et al. | 343/702 |
| 2005/0253669 A1 * | 11/2005 | Tillery | 333/161 |
| 2006/0246953 A1 * | 11/2006 | Yamamoto et al. | 455/562.1 |
| 2006/0252391 A1 * | 11/2006 | Poilasne | 455/121 |

(Continued)

FOREIGN PATENT DOCUMENTS

EP    2403057 A1    1/2012

OTHER PUBLICATIONS

International Search Report and Written Opinion, International Application No. PCT/US2011/044953; International Filing Date: Jul. 22, 2011; Date of Mailing: Dec. 9, 2011, pp. 1-14.

(Continued)

*Primary Examiner* — Ayodeji Ayotunde
(74) *Attorney, Agent, or Firm* — Conley Rose, P.C.; J. Robert Brown, Jr.

(57) ABSTRACT

A method at a device having an antenna and a plurality of parasitic elements, and the device, the method sensing a change in impedance of the antenna; selecting a subset of parasitic element options from a set of parasitic element options based on a stored table of impedances; if the subset of parasitic element options is greater than one, determining a channel quality measure for each parasitic element option within the subset of parasitic element options; and performing a beam steering action based on the change in antenna impedance and channel quality measure if determined, the beam steering action comprising selecting one or more of the plurality of parasitic elements to activate.

18 Claims, 7 Drawing Sheets

(56) References Cited

U.S. PATENT DOCUMENTS

| | | |
|---|---|---|
| 2009/0066440 A1 | 3/2009 | Chan Wai Po et al. |
| 2009/0186587 A1* | 7/2009 | Sobchak et al. ........... 455/196.1 |
| 2010/0156722 A1 | 6/2010 | Park et al. |
| 2010/0197261 A1* | 8/2010 | Zibrik et al. ............... 455/232.1 |
| 2011/0309980 A1 | 12/2011 | Ali et al. |

OTHER PUBLICATIONS

European Extended Search Report; Application No. 11870035.0; Mar. 12, 2015; 8 pages.

* cited by examiner

ADAPTIVELY OPTIMIZED METHOD AND SYSTEM OF PARASITIC ELEMENT SELECTION FOR SMART BEAM STEERING

CROSS-REFERENCE TO RELATED APPLICATIONS

The present application claims priority to PCT application number PCT/US2011/044953, filed Jul. 22, 2011, the entire contents of which are incorporated herein by reference.

FIELD OF THE DISCLOSURE

The present disclosure relates to antennas and in particular to beam steering using parasitic elements within an antenna.

BACKGROUND

Antenna pattern beam steering is a technique proposed mainly to improve signal quality. The steering of the beam can be done through a number of techniques such as through the switching of antenna elements using diodes among other options. Beam steering techniques include manipulation of the antenna structure where the length of the antenna is changing. These techniques are usually used to steer a beam to follow the signal or to avoid interference, hence improving overall signal quality. These techniques are, however, difficult to implement mainly due to the steering mechanism that controls the hardware to achieve the desired beam direction.

Many techniques have been proposed to use the merit of the total received signal in determining the best hardware configuration that steers the beam in the desired direction. To do this, multiple measurements in real time are done in order to know the signal strength from the different directions. The multiple measurements are done in real time and therefore could introduce significant delays, especially if the user is in a fast changing environment.

Additionally, signal strength is not necessarily the best choice for the determination of best hardware configuration, especially if used alone. For example, signal strength is composed of the total desired signal as well as the noise signal combined. Therefore, the total signal strength alone may not be a fair indicator of the channel quality experienced by a specific beam pattern. Hence delayed and inaccurate decisions on the steering directions could be made.

BRIEF DESCRIPTION OF THE DRAWINGS

The present disclosure will be better understood with reference to the drawings, in which.

DETAILED DESCRIPTION OF THE DRAWINGS

The present disclosure provides a method at a device having an antenna and a plurality of parasitic elements, the method comprising: sensing a change in impedance of the antenna; selecting a subset of parasitic element options from a set of parasitic element options based on a stored table of impedances; if the subset of parasitic element options is greater than one, determining a channel quality measure for each parasitic element option within the subset of parasitic element options; and performing a beam steering action based on the change in antenna impedance and channel quality measure if determined, the beam steering action comprising selecting one or more of the plurality of parasitic elements to activate.

The present disclosure further provides a device comprising: a processor; an antenna; and a plurality of selectable parasitic elements, wherein the device is configured to sense a change in impedance of the antenna; select a subset of parasitic element options from a set of parasitic element options based on a stored table of impedances; if the subset of parasitic element options is greater than one, determine a channel quality measure; and perform a beam steering action based on the change in antenna impedance and channel quality measure if determined, the beam steering action comprising selecting one or more of the plurality of parasitic elements to activate.

The present disclosure can be utilized with any beam steering antenna. Two examples of beam steering antennas are shown below with regard to FIGS. 1 and 2. Such antennas are, for example, described with regard to U.S. patent application Ser. No. 12/820,902, the contents of which are incorporated herein by reference. Beam steering, as used herein, includes use of a single radiating antenna which has its radiation pattern steered using passive parasitic elements.

Figure 1:
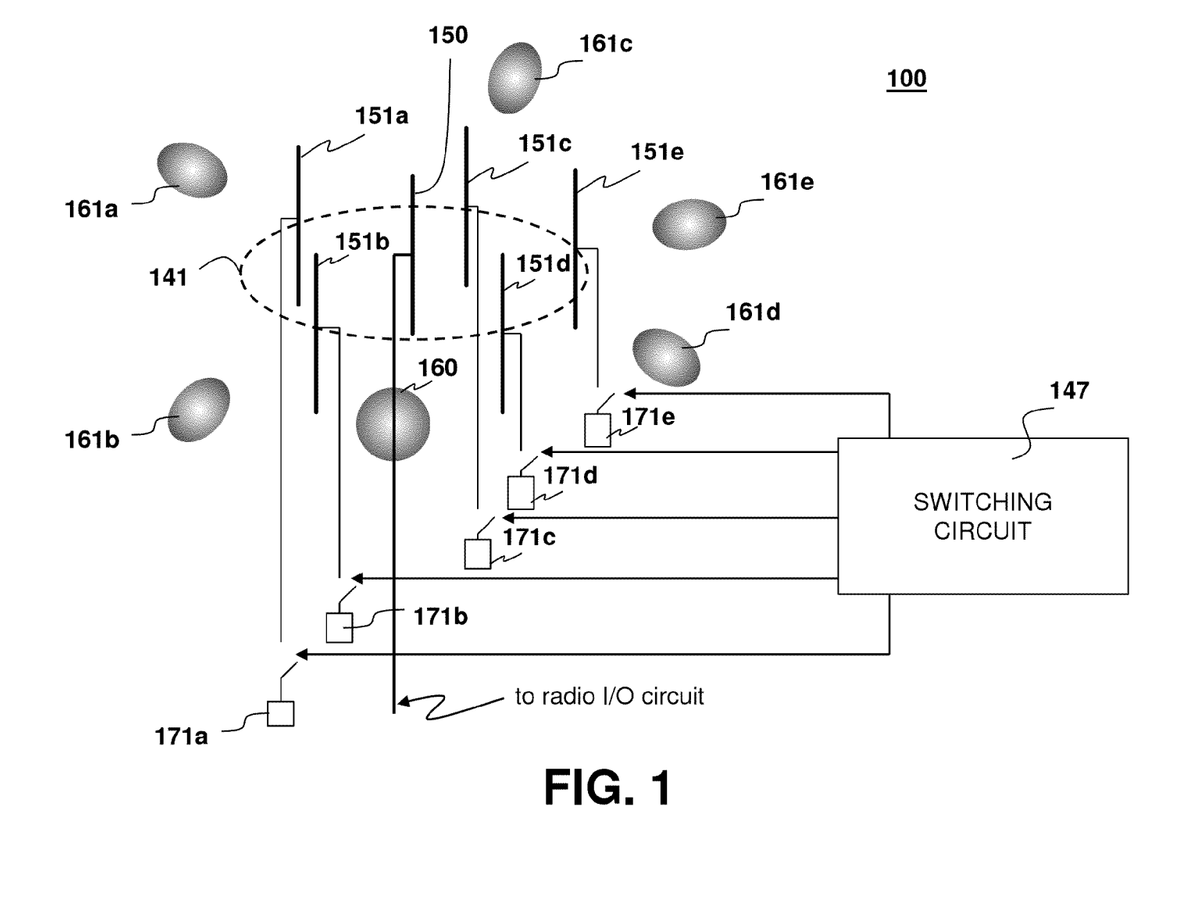
FIG. 1 is a block diagram of an exemplary antenna have selectable parasitic elements.

Specifically, referring to FIG. 1, the figure illustrates a block diagram of one embodiment of a beam steering antenna system 100 for a wireless device in accordance with various aspects set forth herein. In FIG. 1, the system 100 can include a beam steering antenna 141, and various elements as described below.

The beam steering antenna 141 can include a primary radiating element 150 with one or more secondary parasitic elements 151a to 151e. Parasitic elements, as used herein, may be conductive pieces that become electrically connected to the antenna, and hence be part of the antenna, depending on the termination of the parasitic elements. In this embodiment, the primary radiating element 150 is a dipole. Further, there are five reconfigurable parasitic elements, wherein each of the reconfigurable parasitic elements 151a to 151e is a dipole. In the embodiment of FIG. 1, terminators 171a to 171e terminate parasitic elements 151a to 151e respectively. Terminators 171a to 171e may be any terminators, and include, for example, a ground, a reactive terminator or an open terminator.

In another embodiment, the primary radiating element and the reconfigurable parasitic elements are monopoles. It is important to recognize that the primary radiating element and any combination of the reconfigurable parasitic elements form the beam steering antenna, which can radiate with specific characteristics. Further, the primary radiating element and any combination of the reconfigurable parasitic elements can be electrically connected, electrically coupled, or both.

In one definition, a dipole antenna, is an omnidirectional radio antenna with a center-fed driven element, which can be made of, for instance, a simple copper wire. Further, in one definition, a monopole antenna is an omnidirectional antenna formed by replacing one half of a dipole antenna with a ground plane at a substantially perpendicular angle to the monopole, wherein the monopole can behave like a dipole if the ground plane is sufficiently large. The length of a radiating element such as a monopole can typically be as short as about one-quarter the wavelength of the desired resonant frequency. One skilled in the art will appreciate that the length of a radiating element of the present disclosure is not limited to one-quarter the wavelength of the desired resonant frequency, but other lengths may be chosen, such as one-half the wavelength of the desired resonant frequency. Similarly, the length of a radiating element such as a dipole can typically be as short as about one-half the wavelength of the desired resonant frequency.

The beam steering antenna 141 can direct an electromagnetic antenna-pattern beam 161a to 161e radiated from the beam steering antenna 141 to improve the quality of a transmitted signal, received signal, or both. The beam steering antenna 141 can adaptively steer the antenna-pattern beam 161a to 161e towards, for instance, a base station while traveling throughout the coverage area of the base station. For example, a controller, using switching circuit 147, may select the parasitic element 151a. In such configuration, the primary radiating element 150 and the parasitic element 151a cooperatively transmit an antenna-pattern beam in the direction consistent with the antenna-pattern beam 161e. In another example, a controller does not select any reconfigurable parasitic elements 151a to 151e. In such configuration, the primary radiating element 150 provides an omnidirectional beam. In another example, a controller selects the reconfigurable parasitic elements 151a and 151b. In such configuration, the primary radiating element 150 and the reconfigurable parasitic elements 151a and 151b provide an antenna-pattern beam in the direction between the antenna-pattern beams 161e and 161c. Further, the beam steering antenna 141 can direct the antenna-pattern beam 161a to 161e away from a user of the associated wireless device to reduce the amount of electromagnetic energy absorbed by such user. Also, by directing the antenna-pattern beam 161a to 161e of the beam steering antenna 141 towards a receiving antenna such as at a base station can reduce the amount of interference received by other wireless devices.

By more effectively and efficiently receiving RF signals, radiating RF signals, or both, the wireless device using the beam steering antenna 141 can achieve better performance and lower power consumption. It is important to recognize any combination of reconfigurable parasitic elements can be used in conjunction with the primary radiating element. Further, any number of primary and reconfigurable parasitic elements can be used. For example, two primary radiating elements can be used to provide, for instance, polarization diversity. Further, six reconfigurable parasitic elements can be used in conjunction with the two primary radiating elements to cooperatively provide an antenna-pattern beam in a predetermined direction.

In FIG. 1, the adaptive steering of the antenna-pattern beam can be performed using, for instance, switching elements associated with the switching circuit 147 to select parasitic elements 151a and 151b of the beam steering antenna 141. The selected parasitic elements 151a and 151b and the primary radiating element 150 can cooperatively receive and radiate RF signals. For example, a plurality of reconfigurable parasitic elements 151a and 151b such as monopoles, dipoles, or both can be contiguously and uniformly distributed around a primary radiating element 150. Such parasitic elements 151a and 151b can be adaptively switched to cooperatively work with the primary radiating element 150 to adaptively steer the antenna-pattern beam. It is important to recognize that the beam steering antenna configurations described by this disclosure may also provide polarization diversity, frequency diversity, multiband operation, broadband operation, or any combination thereof. Further, a person of ordinary skill in the art will recognize that there are many different antenna systems, structures, and configurations, which may support a beam steering function as described in this disclosure.

Figure 2:
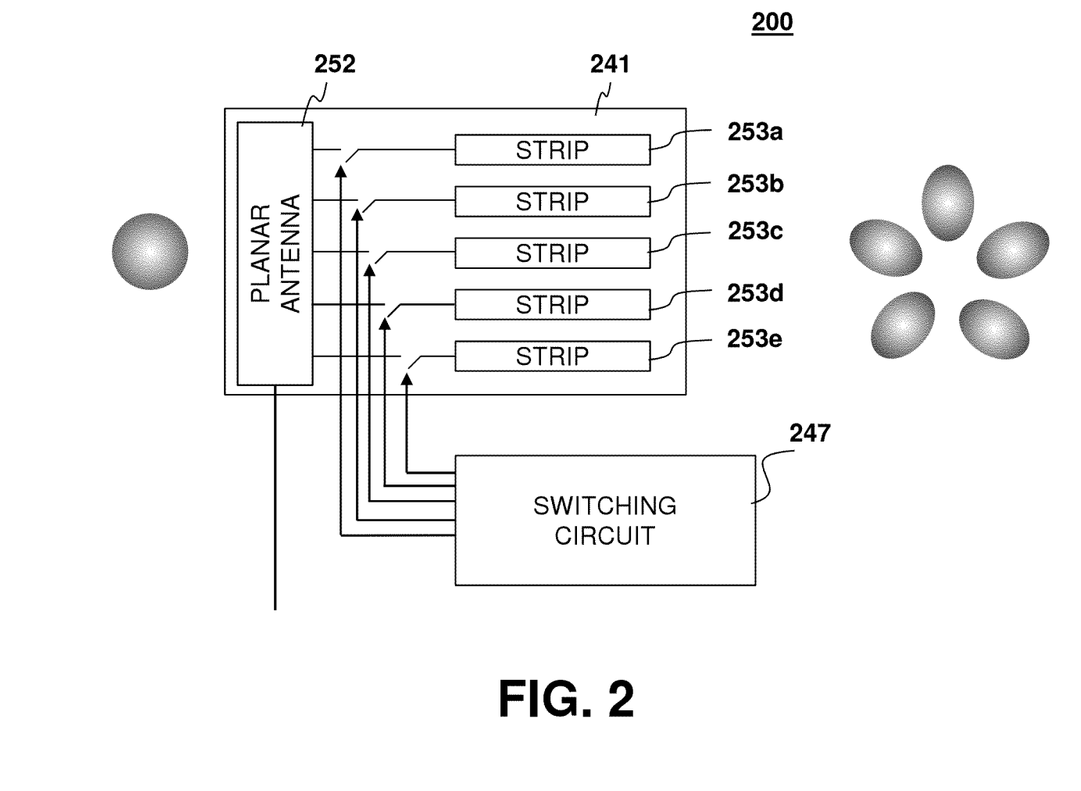
FIG. 2 is a block diagram of an exemplary patch antenna have selectable parasitic elements.

Further, another embodiment of a beam steering antenna is shown below with regard to FIG. 2. FIG. 2 illustrates a block diagram of another embodiment of a beam steering antenna system 200 for a wireless device in accordance with various aspects set forth herein. In FIG. 2, the system 200 can include a beam steering antenna 241, as well as other components as described below.

The beam steering antenna 241 can include a primary radiating element 252 with one or more reconfigurable parasitic elements 253a to 253e. In this embodiment, the primary radiating element 252 is a patch antenna. Further, each of the reconfigurable parasitic elements 253a to 253e is a radiating strip or patch element.

A patch antenna typically is a miniaturized antenna radiating structure, such as a planar inverted-F antenna ("PIFA"). Patch antennas are popular for use in wireless devices due to their low profile, ability to conform to surface profiles, and unlimited shapes and sizes. Patch antenna polarization can be linear or elliptical, with a main polarization component parallel to the surface of the patch antenna. Operating characteristics of patch antennas are predominantly established by their shape and dimensions. A PIFA antenna design can include one or more slots in the antenna's radiating member. Selection of the position, shape, contour, and length of a slot depends on the design requirements of the particular patch antenna. The function of a slot in a patch antenna design includes physically partitioning the radiating member of a single-band patch antenna into a subset of radiating members for multiple-band operation, providing reactive loading to modify the resonant frequencies of a radiating member, and controlling the polarization characteristics of a multiple-band patch antenna. In addition to a slot, radiating members of a patch antenna can have stub members, usually consisting of a tab at the end of a radiating member. The function of a stub member includes providing reactive loading to modify the resonant frequencies of a radiating member.

The beam steering antenna 241 can direct an electromagnetic beam radiated from the beam steering antenna 241 to improve the quality of a transmitted signal, received signal, or both. For example, the beam steering antenna 241 can steer the antenna-pattern beam towards a base station while traveling throughout the coverage area of the base station. Further, the beam steering antenna 241 can direct the antenna-pattern beam away from a user of the associated wireless device to reduce the amount of electromagnetic energy absorbed by such user. Also, by directing the antenna-pattern beam of the beam steering antenna 241 towards a receiving antenna such as at a base station can reduce the amount of interference received by other wireless devices. By more effectively and efficiently receiving RF signals, radiating RF signals, or both, the wireless device using the beam steering antenna 241 can achieve lower power consumption.

In FIG. 2, the steering of the antenna-pattern beam can be performed using, for instance, switching elements associated with the switching circuit 247 to select reconfigurable parasitic elements of the beam steering antenna 241. The selected parasitic elements and the primary radiating element can cooperatively receive and radiate RF signals. For example, a plurality of radiating strip elements 253a to 253e can be adaptively switched to cooperatively work with the patch antenna 252 to steer the antenna-pattern beam. It is important to recognize that the aforementioned beam steering antenna configurations may also provide polarization diversity, frequency diversity, multiband operation, broadband operation, or any combination thereof.

An antenna, such as those described above with regard to FIGS. 1 and 2, could be utilized in a system in accordance with the present disclosure. For example, one exemplary system is described below with regard to FIG. 3.

In accordance with the present disclosure, an optimized method for accurate antenna beam steering is provided, when needed, in real time, via adaptive switching of parasitic elements.

In the case that on-line signal quality measurements are needed, an optimized method is provided that gives an indication of the channel quality through measurements of the actual received power strength in the receive mode rather than total received signal strength, measured at baseband, which may include measurements of the noise levels as well.

In the case that on-line signal quality measurements are needed, an optimized method is provided that gives an indication of the channel quality measured at the antenna terminals through the amount of reflected power back into the radio using, for example, a directional coupler in the transmission mode.

Various channel quality indicators are described herein. In one embodiment, the desired signal strength channel quality indicator is extracted through a training sequence as provided below.

Figure 3:
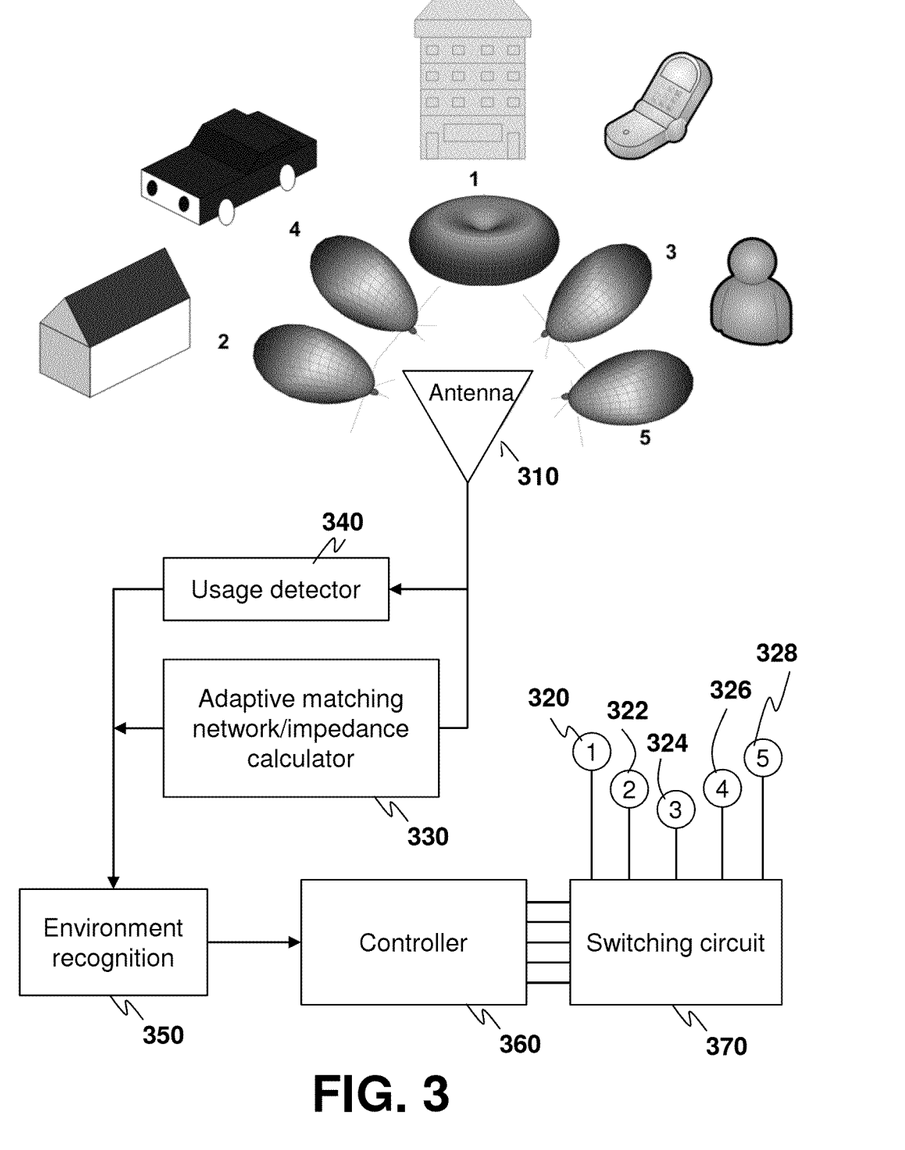
FIG. 3 is a block diagram of an exemplary architecture for the selection of parasitic elements.

In accordance with the embodiment of FIG. 3 antenna 310 could be any antenna with beam steering capabilities. Examples of such an antenna are provided above with regard to FIGS. 1 and 2.

In the example of FIG. 3, five parasitic elements are provided, namely parasitic elements 320, 322, 324, 326 and 328. However, the present disclosure is not meant to be limited to any particular number or configuration of parasitic elements and more or less parasitic elements could be utilized depending on the implementation.

In the embodiment of FIG. 3, parasitic elements 320 to 328 are designed based on their geometric dimensions and their distance and coupling to the main antenna 310.

Antenna 310 is electrically physically connected to an adaptive matching network/impedance calculator block 330. Block 330 can be used to calculate the exact input impedance value in real time for an assessment period. Further, the adaptive matching network can also be used to calculate input impedance and reduce mismatched loss after the parasitic element(s) have been chosen and the new beam steering antenna is formed.

Antenna 310 further provides an input to a usage detector block 340. The usage detector block 340 can be used to determine the operating environment of the wireless device, which may be used to further adapt the antenna pattern beam of beam steering antenna 310. The usage detector block 340 can receive a signal from the antenna 310 and can determine the operating environment of the mobile device by identifying a change in, for example, the received signal strength of beam steering antenna 310, the direction alignment of the mobile device, the propagation characteristics of a received signal, the input impedance of the beam steering antenna 310, or other information or a combination thereof.

For instance, usage detector block 340 can determine that a mobile device is placed against a user's head during a voice call using the call processing state of the mobile device, the directional alignment of the mobile device, a change in input impedance of the beam steering antenna 310, among other factors, or combination thereof. For instance, usage to antenna 310 may use a sensor to indicate that the mobile device is in a substantially horizontal directional alignment consistent with the positioning of the wireless device by the user during a voice call. Each usage detector block 340 may also know the state of the wireless device such as the voice call state or data transmission state.

The outputs from usage detector block 340 and adaptive matching network/impedance calculator block 330 are provided to an environment recognition block 350. Environment recognition block 350 use indicators to determine the operation or environment of the device. Such indicators may include inputs from accelerometers, including test results to indicate whether the device is vertical, horizontal, impedance values to provide whether the device is near the head of a user, among other indicators. The output from environment recognition block 350 is provided to a controller 360. Controller 360 is used to identify the need for a beam steer to select parasitic elements.

Controller 360 can use the calculated impedance and environment factors to match a predefined and stored table of usage scenarios. Thus, a table or linked list or other storage mechanism on the device might be used to match impedance with usage scenarios to determine one or more parasitic elements to turn on. Controller 360 controls switching circuit 370 which then may turn off or on parasitic elements 320, 322, 324, 326 and 328.

The beam steering is done, in one embodiment, in accordance with three main steps.

In a first step, the need to steer beam is identified or the need to change the beam patterns is identified through a change in the calculated real time impedance in conjunction with the usage sensors.

In a second step, once the need for a change and usage scenario have been identified, a set of eligible parasitic elements are selected through the control unit. This selection may utilize an indication of channel quality and such an indication of channel quality may use one or more of the desired signal strength, total signal strength, signal-to-noise ratio and channel capacity.

In a third step, once the choice of parasitic elements has been made by a controller, a new antenna composed of the main antenna plus selected parasitic elements used in the new antenna is created and the new antenna impedance can be re-calculated through the adaptive match circuit to measure the mismatched due to the new parasitic elements.

Figure 4:
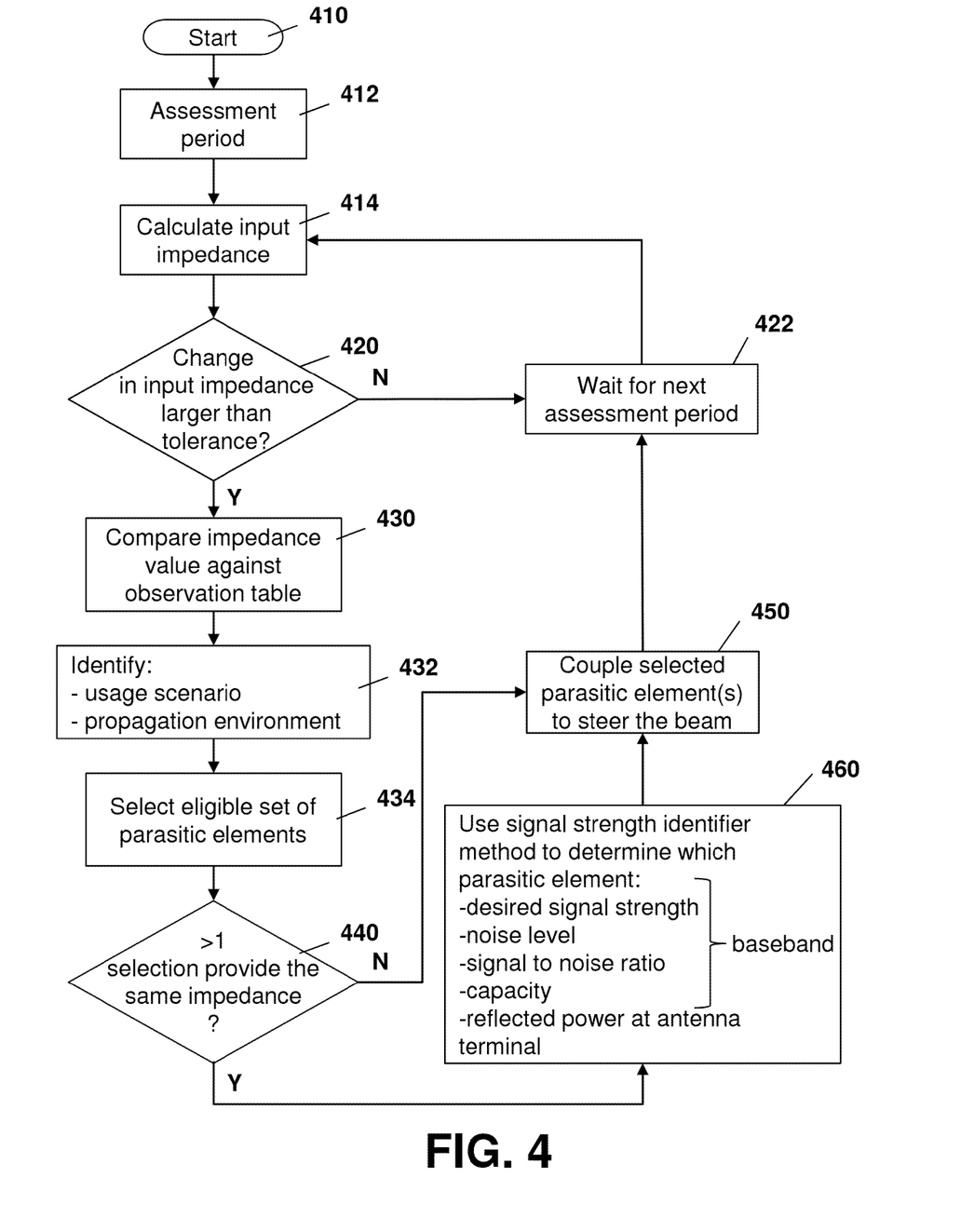
FIG. 4 is a process diagram showing an example method for selecting parasitic elements.

Reference is now made to FIG. 4.

The process of FIG. 4 starts a block 410 and proceeds to block 412 in which an assessment period is determined. In one embodiment, the assessment period could be determined based on a test mode or activation mode on the mobile device.

The process then proceeds to block 414 and the input impedance is calculated. As indicated above, this may be done by the adaptive matching network/impedance calculator block 330 of FIG. 3.

The process then proceeds to block 420 in which the mobile device may calculate a change in input impedance and determine whether the change in input impedance is larger than a tolerance. In one embodiment, the tolerance is predetermined and stored at the mobile device.

From block 420, if the input impedance has no change or a change that is smaller than the tolerance, the process proceeds to block 422 in which the device waits for the next assessment period. In one embodiment, the process may be continuous and have no wait at block 422, in which case the process proceeds back to block 414 immediately.

From block 420, if the change in the input impedance is larger than the tolerance, the process proceeds to block 430 in which the impedance value is compared against an observation table.

Further, the process proceeds to block 432 in which the usage scenario and propagation environment are identified. This is done through, for example, usage detector block 340 and environment recognition block 350.

The information from blocks 430 and 432 are provided to a controller such as controller 360 of FIG. 3 and the process proceeds to block 434 in which an eligible set of parasitic elements is selected. The selection at block 434 can use, for example, a table of values and a secondary table or linked list to make a final determination as to the set of eligible parasitic elements that could be utilized.

The process then proceeds from block 434 to block 440 in which a check is made to determine whether two elements provide the same impedance. If no, the process proceeds to block 450 in which the selected parasitic elements are coupled to steer the beam and the process then proceeds back to block 422 to wait for the next assessment.

Conversely, if two elements provide the same input impedance the process then proceeds to block 460 in which other factors are used to determine which parasitic element to utilize. Such other factors could use signal strength identifiers such as desired signal strength, noise level, signal-to-noise ratio, capacity, total power, among other factors. Based on the determination block 460, parasitic elements are selected which are then provided to block 450 to couple selected parasitic elements to steer the beam. Further, the choice of other factors can change between assessment periods.

The channel quality at block 460 could be calculated by receiving signal samples, correlating the received signal samples with a known sequence to produce correlation values, and forming an estimate of desired power level based on the correlation values. Further the calculation may be done before or after analog to digital conversion.

Some scenarios that would result in the same impedance value for two parasitic elements have patterns that might be antipodal with respect to each other. For example, in the example of FIG. 3, parasitic elements 322 and 328 could be antipodal to each other. In these scenarios, a measure of the channel quality indicator in both directions could be used as the second metric needed to decide on the choice of a parasitic element to couple to the antenna at block 460 in addition to the calculated impedance.

The process then continues to assess the impedance and reconfigure the antenna with parasitic elements as required.

Figure 5:
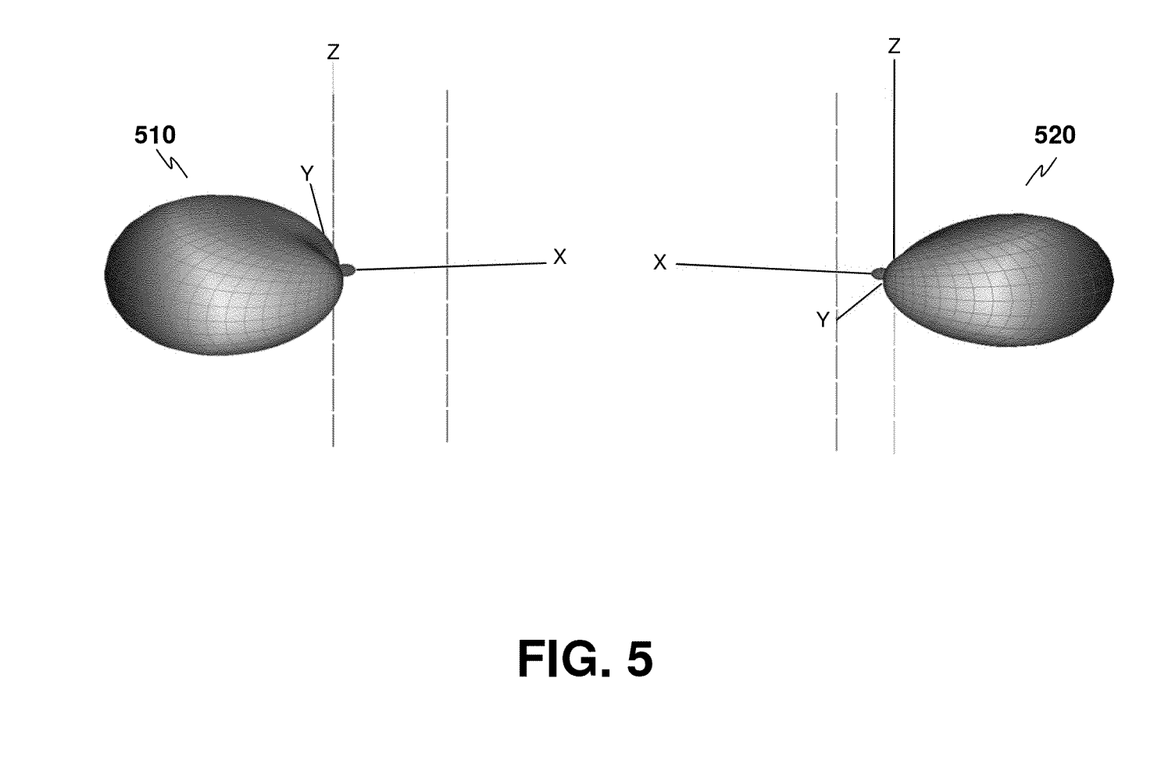
FIG. 5 is a plot showing radiation from an antenna having antipodal parasitic elements selected.

Referring to FIG. 5, FIG. 5 shows an illustration for the beam steering case for a dipole example. In particular, the beam steering case as shown by reference numeral 510 could be the use of the parasitic element 322 from FIG. 3. Conversely, the beam steering case shown by reference numeral 520 could be the use of parasitic element 328 from the example of FIG. 3. The two are opposite to each other and show that the beam steering is in opposite directions. In the example of FIG. 5, the beam steering is shown based on the switching of the parasitic element from left to right or vise versa.

Figure 6:
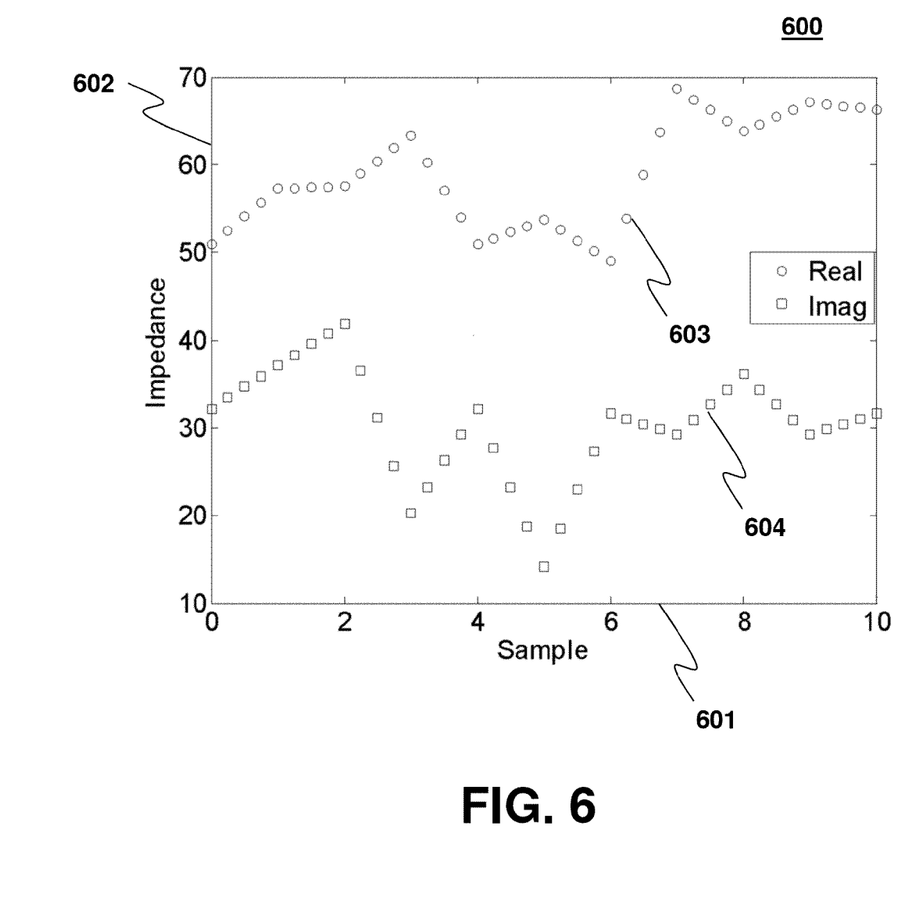
FIG. 6 is a plot of impedance values changing with an environment.

Referring to FIG. 6, FIG. 6 shows a plot of sample impedance values changing with the environment around an antenna when the mobile device is in a voice position. The results show the measured input impedance of the beam steering antenna 310 over time for a user operating a wireless device in a voice call. The graphical representation in its entirety is referred to by 600. The number of the discrete-time sample of the measured input impedance of the beam steering antenna 310 is shown on the abscissa 601. The measured input impedance of the beam steering antenna 310 is shown on the ordinate 602. The graph 603 shows the imaginary values of the measured input impedance of the beam steering antenna 310. The graph 604 shows the real values of the measured input impedance of the beam steering antenna 310.

In the simulation, the beam steering antenna 310 could be antenna 141 from FIG. 1, and uses a half-wavelength dipole for the primary radiating element 150 and five half-wavelength dipoles for the reconfigurable parasitic elements 151a to 151e. Each of the five reconfigurable parasitic elements 151a to 151e are one tenth of a wavelength from the primary radiating element 150. Further, the antenna gain of the primary radiating element 150 is 1.65 dB and the antenna gain of the primary radiating element coupled with one of the reconfigurable parasitic elements 151a to 151e is 4.99 dB. The simulation was performed at a frequency of 900 MHz.

Based on the above, various applications of the proposed mechanism are provided below. However, this is not meant to be exhaustive and other examples would be apparent to those in the art having regard to the present disclosure.

One application of the above may be to compensate for the presence of a user or an obstacle. Elements 322, 324, 326 or 328 could be selected based on the steering direction required to avoid the obstacle.

In a further usage, the selection of the parasitic element may be done to compensate for low scattering environment where omnidirectional patterns would be favored over a directional pattern. In such a case, parasitic element 320 from FIG. 3 could be selected.

In other embodiments, the choice of the parasitic element may be made to cancel interference. For example, the choice of the parasitic element may be done to mitigate interference from another mobile device or cell phone in the vicinity of the user's device.

In other embodiments, the selection of the parasitic element may be done to allow the beam to follow the best communication direction with a tower.

The antenna and elements describe above could be used with any device. If the antenna is used in a mobile device, one exemplary device is described below with regard to FIG. 7.

Mobile device 700 is typically a two-way wireless communication device having voice and data communication capabilities. Mobile device 700 generally has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, a wireless device, a user equipment, or a data communication device, as examples.

Where mobile device 700 is enabled for two-way communication, it will incorporate a communication subsystem 711, including both a receiver 712 and a transmitter 714, as well as associated components such as one or more antenna elements 716 and 718, such as those described above with regards to FIGS. 1 to 3, local oscillators (LOs) 713, and a processing module such as a digital signal processor (DSP) 720. As will be apparent to those skilled in the field of communications, the particular design of the communication subsystem 711 will be dependent upon the communication network in which the device is intended to operate. The radio frequency front end of communication subsystem 711 can be any of the embodiments described above.

Network access requirements will also vary depending upon the type of network 719. In some networks network access is associated with a subscriber or user of mobile device

700. A mobile device may require a removable user identity module (RUIM) or a subscriber identity module (SIM) card in order to operate on a CDMA network. The SIM/RUIM interface 744 is normally similar to a card-slot into which a SIM/RUIM card can be inserted and ejected. The SIM/RUIM card can have memory and hold many key configurations 751, and other information 753 such as identification, and subscriber related information.

Figure 7:
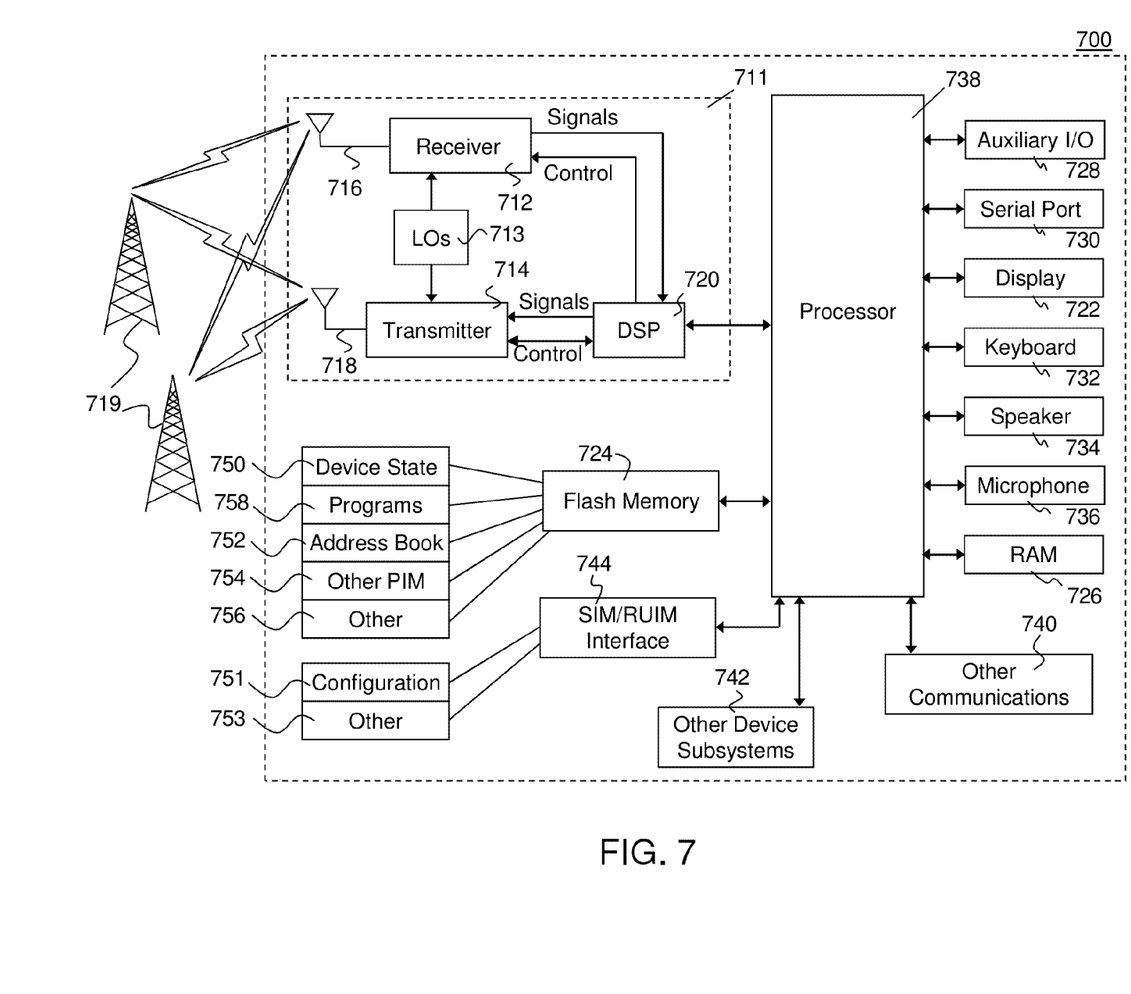
FIG. 7 is a block diagram of an exemplary mobile device capable of being used with the present methods and systems.

When required network registration or activation procedures have been completed, mobile device 700 may send and receive communication signals over the network 719. As illustrated in FIG. 7, network 719 can consist of multiple base stations communicating with the mobile device. For example, in a hybrid CDMA 1x EVDO system, a CDMA base station and an EVDO base station communicate with the mobile station and the mobile device is connected to both simultaneously. Other examples of network technologies and base stations would be apparent to those in the art.

Signals received by antenna 716 through communication network 719 are input to receiver 712, which may perform such common receiver functions as signal amplification, frequency down conversion, filtering, channel selection and the like. ND conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 719 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Mobile device 700 generally includes a processor 738 which controls the overall operation of the device. Communication functions, including data and voice communications, are performed through communication subsystem 711. Processor 738 also interacts with further device subsystems such as the display 722, flash memory 724, random access memory (RAM) 726, auxiliary input/output (I/O) subsystems 728, serial port 730, one or more keyboards or keypads 732, speaker 734, microphone 736, other communication subsystem 740 such as a short-range communications subsystem and any other device subsystems generally designated as 742. Serial port 730 could include a USB port or other port known to those in the art.

Some of the subsystems shown in FIG. 7 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the processor 738 may be stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726.

As shown, flash memory 724 can be segregated into different areas for both computer programs 758 and program data storage 750, 752, 754 and 756. These different storage types indicate that each program can allocate a portion of flash memory 724 for their own data storage requirements. Processor 738, in addition to its operating system functions, may enable execution of software applications on the mobile device. A predetermined set of applications that control basic operations, including at least data and voice communication applications for example, will normally be installed on mobile device 700 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application may have the ability to send and receive data items, via the wireless network 719. In one embodiment, the PIM data items are seamlessly integrated, synchronized and updated, via the wireless network 719, with the mobile device user's corresponding data items stored or associated with a host computer system. Further applications may also be loaded onto the mobile device 700 through the network 719, an auxiliary I/O subsystem 728, serial port 730, short-range communications subsystem 740 or any other suitable subsystem 742, and installed by a user in the RAM 726 or a non-volatile store (not shown) for execution by the processor 738. Such flexibility in application installation increases the functionality of the device and may provide enhanced on-device functions, communication-related functions, or both. For example, secure communication applications may enable electronic commerce functions and other such financial transactions to be performed using the mobile device 700.

In a data communication mode, a received signal such as a text message or web page download will be processed by the communication subsystem 711 and input to the processor 738, which may further process the received signal for output to the display 722, or alternatively to an auxiliary I/O device 728.

A user of mobile device 700 may also compose data items such as email messages for example, using the keyboard 732, which may be a complete alphanumeric keyboard or telephone-type keypad, among others, in conjunction with the display 722 and possibly an auxiliary I/O device 728. Such composed items may then be transmitted over a communication network through the communication subsystem 711.

For voice communications, overall operation of mobile device 700 is similar, except that received signals would typically be output to a speaker 734 and signals for transmission would be generated by a microphone 736. Alternative voice or audio I/O subsystems, such as a voice message recording subsystem, may also be implemented on mobile device 700. Although voice or audio signal output is preferably accomplished primarily through the speaker 734, display 722 may also be used to provide an indication of the identity of a calling party, the duration of a voice call, or other voice call related information for example.

Serial port 730 in FIG. 7 would normally be implemented in a personal digital assistant (PDA)-type mobile device for which synchronization with a user's desktop computer (not shown) may be desirable, but is an optional device component. Such a port 730 would enable a user to set preferences through an external device or software application and would extend the capabilities of mobile device 700 by providing for information or software downloads to mobile device 700 other than through a wireless communication network. The alternate download path may for example be used to load an encryption key onto the device through a direct and thus reliable and trusted connection to thereby enable secure device communication. As will be appreciated by those skilled in the art, serial port 730 can further be used to connect the mobile device to a computer to act as a modem.

Other communications subsystems 740, such as a short-range communications subsystem, is a further optional component which may provide for communication between mobile device 700 and different systems or devices, which need not necessarily be similar devices. For example, the subsystem 740 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a device having an antenna and a plurality of parasitic elements, the method comprising:
    sensing a change in impedance of the antenna;
    selecting a subset of parasitic element options from a set of parasitic element options based on a stored table of impedances, the parasitic elements each comprised of non-tunable conductive strips which may be selectively electrically connected to the antenna;
    if the subset of parasitic element options is greater than one and if at least a pair of parasitic elements each provides a same antenna impedance, then for each parasitic element option within the subset of parasitic element options:
    receiving at said antenna signal samples encoded with known sequence; and
    correlating the received signal samples with the known sequence to determine a channel quality measure; and
    wherein the method further comprises performing a beam steering action based on the change in antenna impedance and the channel quality measure, the beam steering action comprising selecting one or more of the plurality of parasitic elements to connect to said antenna such that signal quality is improved.

2. The method of claim 1, wherein the beam steering action compares the antenna impedance with a usage scenario to select at least one candidate subset of parasitic element options.

3. The method of claim 2, wherein the antenna impedance and usage scenarios are pre-stored in the table at the device.

4. The method of claim 3, wherein the table stores pre-calculated impedance values that describe the usage scenario of the device.

5. The method of claim 2, wherein, if more than one subset of parasitic element options are selected, utilizing the channel quality measures to choose between the subsets of parasitic element options selected.

6. The method of claim 5, wherein the channel quality measure includes sensing of the reflected power measured at terminals of the antenna in a transmission mode.

7. The method of claim 6, wherein the channel quality measure is performed at the beam steering antenna terminals in the transmission mode.

8. The method of claim 5, wherein a choice of the channel quality measure can change.

9. The method of claim 5, wherein the channel quality measure is performed before analog to digital conversion.

10. The method of claim 5, wherein the channel quality measure is performed after analog to digital conversion.

11. The method of claim 1, wherein the method is repeated after an assessment period has expired.

12. The method of claim 1, wherein the impedance is calculated through an adaptive matching circuit.

13. The method of claim 12, further comprising, after the performing the beam steering, the antenna plus selected at least one parasitic element impedance is recalculated through an adaptive matching circuit where the adaptive matching circuit is retuned to match the antenna plus selected at least one parasitic element.

14. The method of claim 2, wherein the usage scenario is calculated through a usage detector and environment detector circuit.

15. A device comprising:
    a processor;
    an antenna; and
    a plurality of selectable parasitic elements,
    wherein the processor is configured to:
    sense a change in impedance of the antenna;
    select a subset of parasitic element options from a set of parasitic element options based on a stored table of impedances, the parasitic elements each comprised of non-tunable conductive strips which may be selectively electrically connected to the antenna;
    if the subset of parasitic element options is greater than one and if at least a pair of parasitic elements each provides a same antenna impedance, then for each parasitic element option within the subset of parasitic element options:
    receive at said antenna, signal samples encoded with a known sequence; and
    correlate the received signal samples with the known sequence to determine a channel quality measure;
    wherein the processor is further configured to perform a beam steering action based on the change in antenna impedance and channel quality measure, the beam steering action comprising selecting one or more of the plurality of parasitic elements to connect to said antenna such that signal quality is improved.

16. An antenna circuit for a device, the antenna circuit comprising:
    a main antenna;
    a plurality of selectable parasitic elements the parasitic elements each comprised of non-tunable conductive strips which may be selectively electrically connected to the main antenna;
    an adaptive matching circuit; and
    a control unit,
    wherein the antenna circuit is configured to:
    sense a change in impedance of the antenna at the adaptive matching circuit;

select a parasitic element option from a set of parasitic element options at the control unit;

determine a channel quality measure for each parasitic element option within the subset of parasitic element options if at least a pair of parasitic elements each provides a same antenna impedance, wherein to determine the channel quality measure comprises:

receive at said antenna signal samples encoded with a known sequence; and correlate the received signal samples with the known sequence to determine a channel quality measure; and wherein the antenna circuit is further configured to select one or more of the plurality of parasitic elements to connect to the main antenna at the control unit based on the channel quality measure such that signal quality is improved.

17. The antenna circuit of claim 16, wherein the antenna circuit is configured to select the parasitic element option based on a table of impedances, wherein if the subset of parasitic element options is greater than one, the antenna circuit is further configured to determine a channel quality measure for each parasitic element option within the subset of parasitic element options at the adaptive matching circuit.

18. The antenna circuit of claim 17, wherein the antenna circuit is configured to select one or more of the plurality of parasitic elements to activate using the channel quality measure for each parasitic element option.

* * * * *